United States Patent
Gossage

(10) Patent No.: US 7,165,289 B1
(45) Date of Patent: Jan. 23, 2007

(54) ANIMAL SHAPED TOY RECOVERY AND STORAGE DEVICE

(76) Inventor: Anne Gossage, 1721 Stangeland, Ponca City, OK (US) 74604

( * ) Notice: Subject to any disclaimer, the term of this patent is extended or adjusted under 35 U.S.C. 154(b) by 634 days.

(21) Appl. No.: 10/703,845

(22) Filed: Nov. 7, 2003

(51) Int. Cl.
 A47L 5/36 (2006.01)
 B65G 53/24 (2006.01)

(52) U.S. Cl. ............... 15/347; 15/327.1; 15/314
(58) Field of Classification Search ............... 15/314, 15/327.1, 327.2, 327.6, 327.7, 347, 340.1, 15/319; 406/113–115, 151; D32/18, 21, D32/23, 24
See application file for complete search history.

(56) References Cited

U.S. PATENT DOCUMENTS

| | | | |
|---|---|---|---|
| 3,458,891 A * | 8/1969 | Grellsson | 15/327.1 |
| 3,771,192 A | 11/1973 | Zaleski | |
| 3,819,049 A * | 6/1974 | Koerner et al. | 209/250 |
| 4,467,494 A * | 8/1984 | Jones | 15/353 |
| 4,656,687 A | 4/1987 | Wel | |
| 4,917,648 A | 4/1990 | Hartje | |
| D318,154 S * | 7/1991 | Wen | D32/21 |
| D325,656 S * | 4/1992 | Davis | D32/21 |
| D338,752 S * | 8/1993 | Bart | D32/18 |
| D382,384 S * | 8/1997 | Jones | D32/18 |
| 5,758,992 A * | 6/1998 | Sawallisch | 406/151 |
| 5,904,196 A | 5/1999 | Wickers | |
| 6,048,249 A | 4/2000 | Vendenberg | |
| 6,859,975 B2 * | 3/2005 | Ohta et al. | 15/347 |
| 7,077,399 B2 * | 7/2006 | Yamagishi | 273/148 R |

* cited by examiner

Primary Examiner—Terrence R. Till
(74) Attorney, Agent, or Firm—Randal D. Homburg

(57) ABSTRACT

A recovery and storage device suitable for picking up children's toys and placing them in a storage container has an appearance of a novelty animal, primarily an elephant, including an anatomical frame member with a vacuum motor integrated with a vacuum housing including a flexible hose, which picks up the toys through the flexible hose and directs the toys through the vacuum housing to a chute, where the toys are deposited in a removable storage bin, the device having several safety features which are suited to deter use by small children, requiring an adult or older child to operate the device. The removable storage bins may be placed on a shelf when full and replace with an empty removable storage bin, segregating toys by lot and kind.

6 Claims, 3 Drawing Sheets

ANIMAL SHAPED TOY RECOVERY AND STORAGE DEVICE

CROSS REFERENCE TO RELATED APPLICATIONS

None

BACKGROUND OF THE INVENTION

1. Field of Invention

A recovery and storage device is suitable for picking up children's toys and placing them in a storage container, the device having the appearance of a novelty animal, primarily an elephant, although other animals could be used to form the non-functional outer shell of the device. Within the shell of the device is a vacuum motor integrated with a cylindrical channel system and a hose, which sucks up the toys through the hose and directs the toys through the channel system to a chute, where the toys are deposited in a storage container, the device having several safety features which are suited to deter use by small children, requiring an adult or older child to operate the device. The storage container is removable for placement on a shelf with multiple storage containers being insertable within the device for picking up and segregating toys by lot.

2. Description of Prior Art

The following United States patents were discovered and are disclosed within this application for utility patent. All relate to vacuum devices or devices intended to pick up small toys.

A cover for a vacuum is simply a decorative animal cover which is placed over an upright vacuum cleaner, presented in U.S. Pat. No. 5,904,196 to Wickers. An attachment for a standard vacuum hose is disclosed in U.S. Pat. No. 6,048,249 to Vandenberg, which picks up small toys and deposits them into a bag attachment, while allowing dirt and debris to pass through vent holes into the vacuum cleaner. A third U.S. patent to Zaleski is a vacuum cleaner located within the body of a container appearing to be a real dog, has a retractable hose coming from the tail of the dog, but is also convertible to a heated dryer, the device intended to be used by a pet groomer to reduce fear in pets being groomed of conventional vacuum cleaners, the inventor apparently assuming that the pet would be less nervous about having a vacuum appearing to be another dog.

An elephant shaped car cleaner and air pump is disclosed in U.S. Pat. No. 4,656,687 to Wei, having a vacuum end at the front of the rigid device (no hose is included on the vacuum end) with a retractable air hose coming out of the rear of the device for providing air through an air chuck apparently to a low tire, the device utilizing a air flow means to generate suction for the front end and compressed air to the rear end of the hand-held device.

None of the devices, alone or in combination, provide a toy pick-up and storage device having the safety features of the current device, the flexible air hose and air channeling system, the retractable cord presented in the current device, the wiring and electrical components disclosed in the current device, and the removable storage containers within the present device with which the segregated toys may be stored outside the container in open basket containers.

SUMMARY OF THE INVENTION

Picking up children's toys is a task most parents find time consuming and children find to be a task not worthy of their efforts. Conventional means involves simply bending over and picking up the toys a piece at a time, putting them into some form of container and repeating this process daily. Many toys contain many small pieces that are difficult to see and gather. The present invention involves a device which allows toys to be picked up using a vacuum system by a device that is appealing to children and might stimulate an interest in the child to pick up their own toys, with the assistance and supervision of an adult, an adult required to activate the device by activation of safety features required to operate the device. The device also allows for pickup of one type of toys with the device, removal of an internal storage container and replacement of a different storage container for a different type of toy. The device will pick up any toy smaller than the hose end, which would include building blocks, doll clothing and accessories, small cars, marbles and even candy. Several safety features prevent activation of the device by a small child, including a power switch located behind a child resistant panel, a retractable electrical plug at the rear of the device beneath a tail, and a switch or electrical contact means in the lid of the device, requiring the lid to be securely fastened to the device in order for the device to operate, preventing access by a child to any working components of the device, other than the small hose end.

The primary objective of the invention is to provide a safety device to pick up small toys using a vacuum hose and a vacuum channel system directing the small toys to a removable storage container, the removable storage container being replaceable with a plurality of storage containers.

A secondary objective of the invention is to provide the device with safety features requiring the operation and activation of the device by an adult or older child. A third objective of the invention is to provide the device in an attractive and entertaining embodiment to invoke desire in the child to pick up their toys.

DESCRIPTION OF THE DRAWINGS

The following drawings are submitted with this utility patent application.

DESCRIPTION OF THE PREFERRED EMBODIMENT

Figure 1:
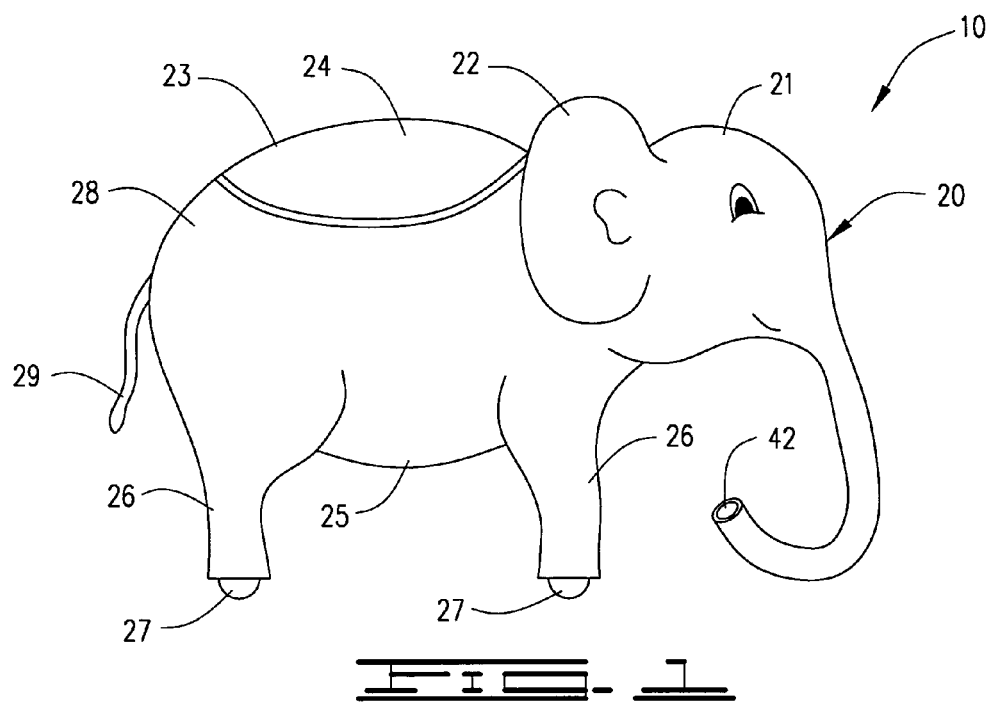
FIG. 1 is a side view of the toy vacuum device.

A novelty animal vacuum device 10 for picking up small children's toy items and placing the toy items into removable storage bins, shown in FIGS. 1–5, comprises a frame member 20 having an outer shape and appearance of a novelty animal, more specifically an elephant for purposes of the drawings, the frame member 20 having an anatomical head 21, a body 23 including a removable lid 24 and a belly 25, four legs 26 and a rear portion 28 including a tail 29, a vacuum producing means 30 located within the head 21 integrated with a vacuum housing 40, the vacuum housing 40 having a vacuum hose end 41 connected to a flexible hose 42, a ventilated end 43 connected to the vacuum producing means 30, and an ejection end 46 connected to a chute 47, the chute 47 directing objects gathered through the flexible hose 42 into the vacuum housing 40 to a removable storage bin 50 located within the belly 25 of the frame member 20, the novelty animal device 10 further providing an electrical wiring system 60 including retractable electrical cord 62 extending from the rear portion 28 of the frame member 20 underneath the tail 29, the retractable electrical cord 62 on a cord reel 63 further connected to at least one safety contact means 64 by electrical wiring 65a closing the electrical wiring system 60 when the removable lid 24 is secured in place and opening the electrical wiring system 60 when the removable lid 24 is displaced, the safety contact means 64 further connected to a safety power switch 68 by electrical wiring 65b, said safety power switch 68 located in the head 21 of the frame member 20, the safety power switch 68 connected to the vacuum producing means 30 by electrical wiring 65c to provide power to operate the vacuum producing means 30, wherein the device 10 operates by activating the safety power switch 68 once the removable lid 24 is secured, and using the flexible hose 42 to gather small toys on the floor into one of the removable storage bins 50 within the device 10, deactivating the safety power switch 68 when finished picking up the small toys, removing the removable lid 24, extracting the now toy filled removable storage bin 50 from the belly 25 of the frame member 20, and placing another removable storage bin 50 into the belly 25 of the frame member 20 for later use, re-securing the removable lid 24 on the frame member 20 prior to the later use of the device 10.

Figure 2:
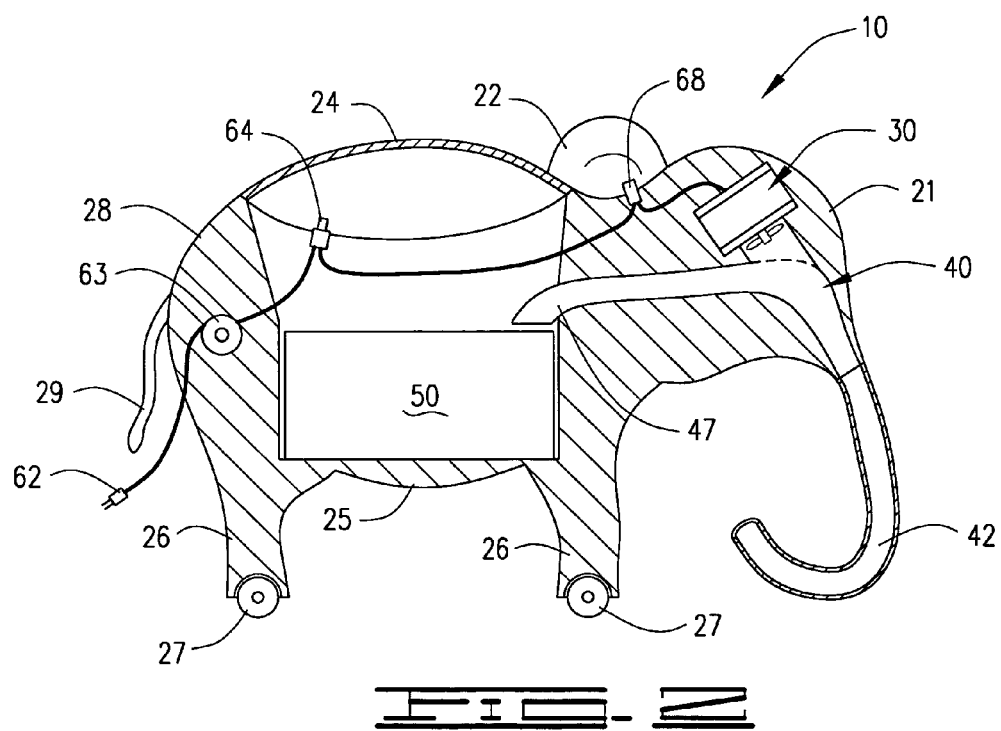
FIG. 2 is a side cross sectional view of the toy vacuum device.
Figure 3:
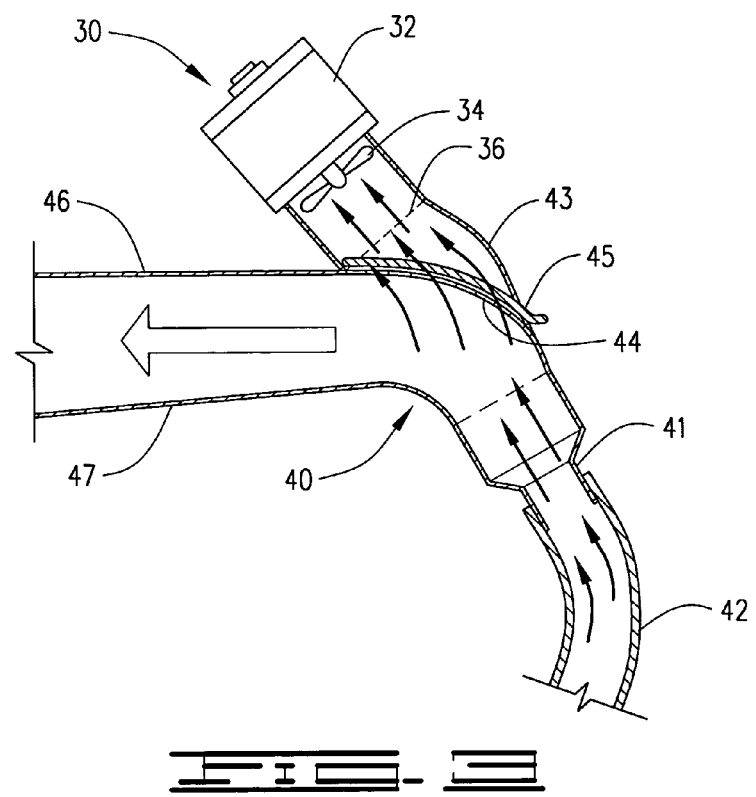
FIG. 3 is a side cross sectional view of the vacuum motor, channel, chute and hose connection.

The vacuum producing means 30, shown in FIGS. 2 and 3, further comprises an electrical vacuum motor 32 connecting to a vacuum fan blade 34 producing the vacuum, the vacuum fan blade 34 contained within a ventilated vacuum screen 36 to isolate the vacuum fan blade 34 from any object. The vacuum motor 32 should be selected and matched to produce a vacuum sufficient to drawn objects through the flexible hose 42 into the vacuum housing 40 with enough velocity to propel the objects into the chute 47 for deposit into the removable storage bin 50, yet not so powerful as to retain the drawn objects within the vacuum housing 40.

It is preferable that the vacuum housing 40, shown in FIG. 3, include an object deflection panel 44 within the vacuum housing 40 prior to the ventilated end 43, and prior to the vacuum producing means 30. This object deflection panel 44 prevents objects from entry into the ventilated end 43 and the vacuum producing means 30, diverting the objects into the ejection end 46 to the chute 47. The object deflection panel 44 should be positioned at an angle to optimize the deflection of the objects to the ejection end 46. Even more preferably would be the inclusion of a removable filter panel 45 within the object deflection screen 44 to catch dirt, lint and debris prior to entry within the vacuum producing means 30, the removable filter panel 45 periodically removed and cleaned, similar to the filter screen in a clothes dryer.

Figure 4:
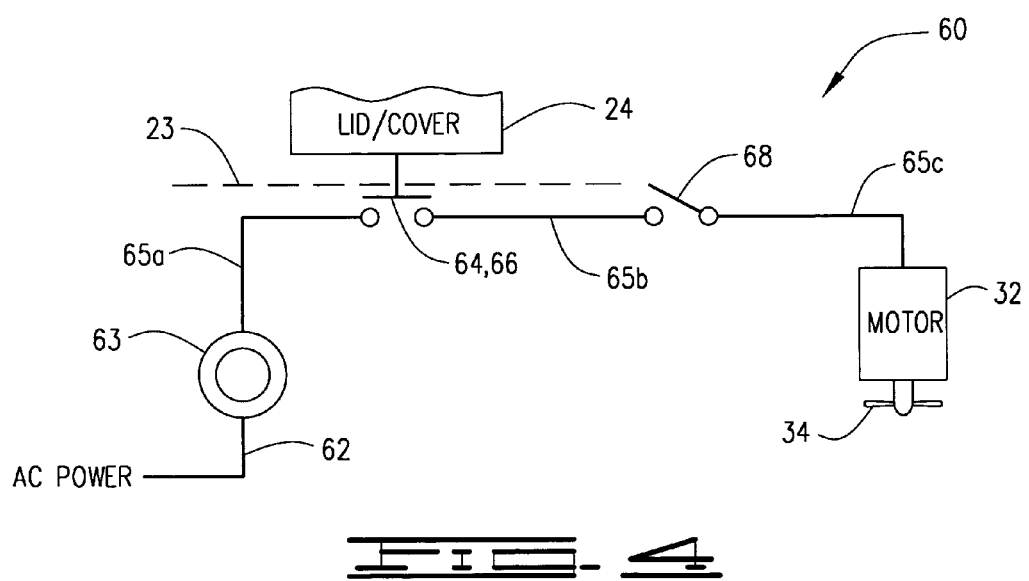
FIG. 4 is a diagram of a first embodiment of electrical wiring system including contacts in the lid.
Figure 5:
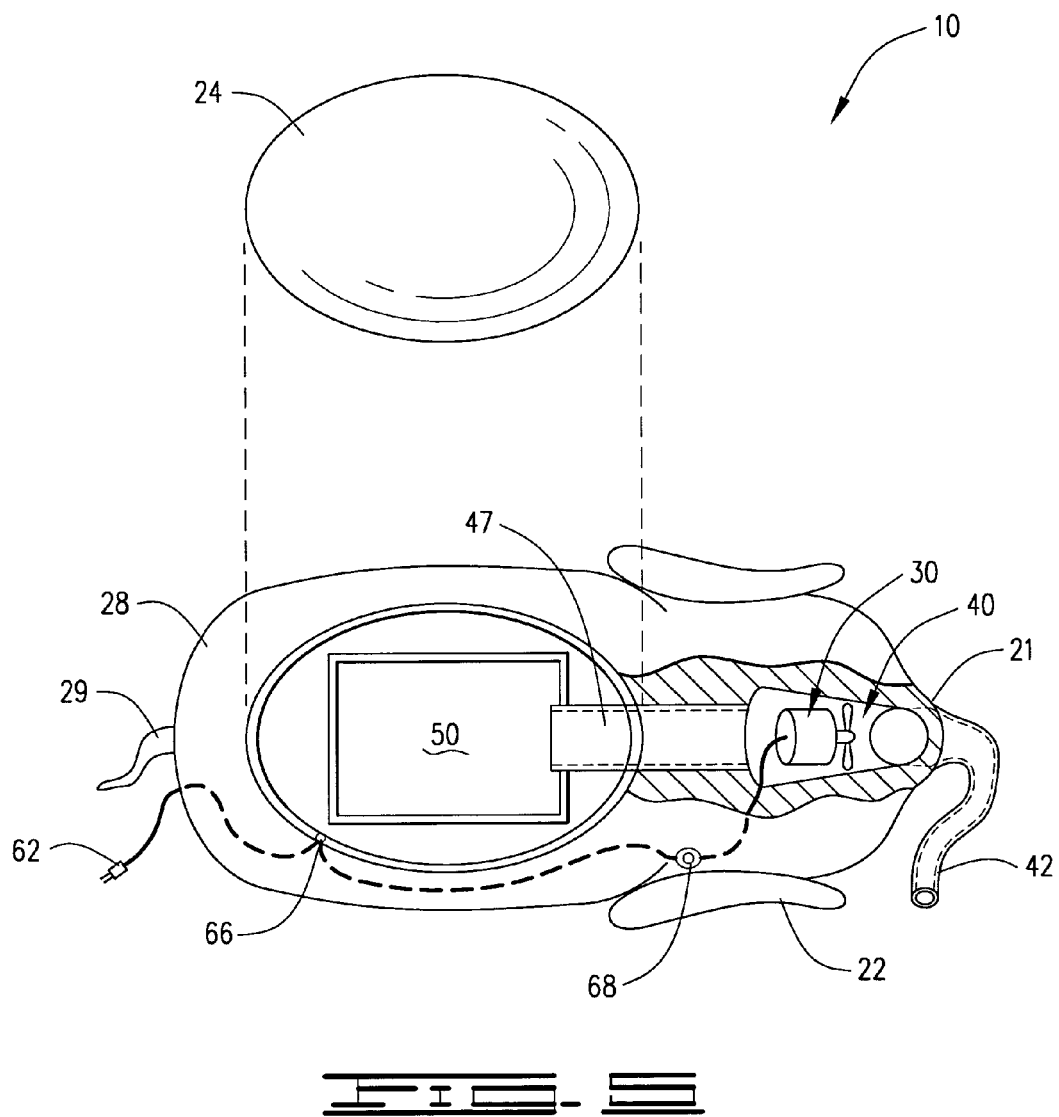
FIG. 5 is an upper view of the device with the removable lid detached.

The safety contact means 64 is further disclosed as a depression contact switch 66, in FIGS. 4–5, which closes the electrical wiring system, FIG. 4, when depressed and opens the electrical wiring system when not depressed. When the removable lid 24 is in place, the depression contact switch 66 is depressed and when the removable lid 24 is not in place, the depression contact switch 66 is not depressed. Since the electrical wiring system 60 is operated by A/C power, the electrical wiring 65a, 65b, 65c is double or triple wire, if a ground is incorporated into the wiring, which is recommended. One of the power wires of the electrical wiring 65a, 65b, 65c, would be connected to the depression contact switch 66, the depression contact switch 66 completing that wire's circuitry from the retractable power cord 62 to the safety power switch 68, the safety power switch 68 also being an intentionally activated switch required to be activated to operate the vacuum producing means 30 or the electrical vacuum motor 32.

For portability purposes, the legs 26 may be supported by wheels 27, FIGS. 1–2, which allow the device 10 to be rolled to a location for use. The tail 29 is also used to conceal the location of the end of the retractable electrical cord 62, FIGS. 1 and 5. The device 10 may also be used as a simple toy box when not being used as a vacuum with the removable lid 24 attaching to the frame member 20 when toys are put away manually or by use of the vacuum producing means 30. It is preferred that the removable storage bin 50 be made of a type of rigid open mesh, similar to a milk crate, which would promote the displacement of any dirt and debris which might be picked up during the vacuum process, intermingled with the toys being picked up and deposited within the removable storage bin 50, the debris being displaced through the removable storage bin 50 while the toys are retained in the removable storage bin 50. An optional trap door in the belly, not shown, may be included to allow for removal of the debris gathered below the removable storage bins 50.

The safety power switch 68 may also be placed within some type of protective housing which would require some degree of advanced skill beyond that of a child of tender years to open. This protective housing is not shown in the drawings, but is contemplated within the scope of this invention. This protective housing may include a complex opening latch, a combination of activities resulting in the opening of the housing, a hidden location or even a keyed lock. In the device 10 which bears the shape of the elephant, as illustrated by the drawings in FIG. 5, the safety power switch 68 is concealed behind an ear 22 of the elephant, the ear 22 possibly including a spring loaded means of urging the ear against the head 21 of the elephant with some degree of required intentional force to pull the ear away from the elephant's head 21.

The device 10 is used by first moving the device 10 to the location for use. The retractable electrical cord 62 is plugged into an available A/C outlet. The removable lid 24 is secured to the frame member 20 once a removable storage bin 50 is placed within the frame member 20. The safety power switch 68 is then activated, providing power to the vacuum producing means 30 and items such as toys, doll clothing, doll accessories, building blocks or other items small enough to fit within the flexible hose 42 are gathered into the flexible hose 42 and deposited in the removable storage bin 50 until the items are picked up. The safety power switch is then deactivated and the removable lid 24 is removed, allowing removal of the filled removable storage bin 50 an empty removable storage bin 50 is replaced. The device 10 is then ready for later use for other items or another time of use. The device 10 is then unplugged and put away for later use, the retractable electrical cord 62 being wound within the cord reel 63 an concealed beneath the tail 29 of the frame member 20.

While the invention has been particularly shown and described with reference to a preferred embodiment thereof, it will be understood by those skilled in the art that changes in form and detail may be made therein without departing from the spirit and scope of the invention.

What is claimed is:

1. A novelty animal vacuum device for picking up small children's toy items and placing the toy items into removable storage bins comprises:
   a frame member having an outer shape and appearance of a novelty animal, said frame member having an anatomical head, a body including a removable lid and a belly, four legs and a rear portion including a tail;
   a vacuum producing means located within said head;
   a vacuum housing having a vacuum hose end connected to a flexible hose, a ventilated end connected to said vacuum producing means, and an ejection end connected to a chute, said chute directing objects gathered through said flexible hose into said vacuum housing to one of a plurality of removable storage bins located within said belly of said frame member; and an electrical wiring system including retractable electrical cord on a cord reel extending from said rear portion of said frame member underneath said tail, said retractable electrical cord further connected to at least one safety contact means closing said electrical wiring system when said removable lid is secured in place and opening said electrical wiring system when said removable lid is displaced, said safety contact means further connected to a safety power switch by electrical wiring, said safety power switch located in said head of said outer frame member, said safety power switch connected by electrical wiring to said vacuum producing means to provide power to operate said vacuum producing means.

2. The novelty animal vacuum device, as disclosed in claim 1, said vacuum producing means further comprising:
   an electrical vacuum motor connecting to a vacuum fan blade producing a vacuum, said vacuum fan blade contained within a ventilated vacuum screen to isolate said vacuum fan blade from said toy items, said motor producing said vacuum sufficient to drawn objects through said flexible hose into said vacuum housing with sufficient velocity to propel said toy items into said chute for deposit into said removable storage bin, without retaining said toy items within said vacuum housing.

3. The novelty animal vacuum device, as disclosed in claim 1, said vacuum housing further comprising:
   an object deflection panel within said vacuum housing covering said ventilated end, prior to said vacuum producing means, preventing said toy items from entry into said ventilated end and said vacuum producing means, diverting said toy items into the ejection end to the chute, said object deflection panel positioned at an angle to optimize the deflection of said toy items to the ejection end; and
   a removable filter panel within said object deflection screen to filter dirt, lint and debris prior to entry into said vacuum producing means.

4. The novelty animal vacuum device, as disclosed in claim 1, wherein said safety contact means is a depression contact switch, located underneath said removable lid in the frame member, closing said electrical wiring system when depressed with the removable lid in place, and opening said electrical wiring system when not depressed, with the removable lid not in place.

5. A novelty animal vacuum device for picking up small children's toy items and placing the toy items into removable storage bins comprises:
   a frame member having an outer shape and appearance of a novelty animal, said frame member having an anatomical head, a body including a removable lid and a belly, four legs having wheels extending from said legs and a rear portion including a tail;
   a vacuum housing within said head of the frame member having a vacuum hose end connected to a flexible hose, a ventilated end connected to said vacuum producing means, and an ejection end connected to a chute, said chute directing objects gathered through said flexible hose into said vacuum housing to one of a plurality of removable storage bins located within said belly of said frame member;
   a vacuum producing means also located within said head, said vacuum producing means further comprising an electrical vacuum motor connecting to a vacuum fan blade producing a vacuum, said vacuum fan blade contained within a ventilated vacuum screen to isolate said vacuum fan blade from said toy items, said motor producing said vacuum sufficient to drawn objects through said flexible hose into said vacuum housing with sufficient velocity to propel said toy items into said chute for deposit into said removable storage bin, without retaining said toy items within said vacuum housing;
   an object deflection panel within said vacuum housing covering said ventilated end, prior to said vacuum producing means, preventing said toy items from entry into said ventilated end and said vacuum producing means, diverting said toy items into the ejection end to the chute, said object deflection panel positioned at an angle to optimize the deflection of said toy items to the ejection end;
   a removable filter panel within said object deflection screen to filter dirt, lint and debris prior to entry into said vacuum producing means; and
   an electrical wiring system including retractable electrical cord extending from said rear portion of said frame member underneath said tail, said retractable electrical cord on a cord reel further connected to at least one safety contact means closing said electrical wiring system when said removable lid is secured in place and opening said electrical wiring system when said removable lid is displaced, said safety contact means further connected to a safety power switch by electrical wiring, said safety power switch located in said head of said outer frame member, said safety power switch connected by electrical wiring to said vacuum producing means to provide power to operate said vacuum producing means.

6. The novelty animal vacuum device, as disclosed in claim 5, wherein said safety contact means is a depression contact switch, located underneath said removable lid in the frame member, closing said electrical wiring system when depressed with the removable lid in place, and opening said electrical wiring system when not depressed, with the removable lid not in place.

* * * * *